US010496129B2

(12) United States Patent
Miyamoto et al.

(10) Patent No.: US 10,496,129 B2
(45) Date of Patent: Dec. 3, 2019

(54) HINGE DEVICE AND ELECTRONIC APPARATUS

(71) Applicant: LENOVO (SINGAPORE) PTE. LTD., Singapore (SG)

(72) Inventors: Tabito Miyamoto, Yokohama (JP); Yu Takahashi, Yokohama (JP); Masato Ito, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/037,568

(22) Filed: Jul. 17, 2018

(65) Prior Publication Data
US 2019/0324499 A1  Oct. 24, 2019

(30) Foreign Application Priority Data

Apr. 20, 2018  (JP) .................................. 2018-081712

(51) Int. Cl.
*G06F 1/16* (2006.01)
*H01H 13/705* (2006.01)

(52) U.S. Cl.
CPC .......... *G06F 1/1618* (2013.01); *G06F 1/1681* (2013.01); *G06F 1/1666* (2013.01); *H01H 13/705* (2013.01)

(58) Field of Classification Search
CPC ...... G06F 1/1626; G06F 1/163; G06F 1/1641; G06F 1/1643; G06F 1/1652; G06F 1/1681; G06F 1/1618; H01H 13/705
See application file for complete search history.

(56) References Cited

U.S. PATENT DOCUMENTS

| | | | | |
|---|---|---|---|---|
| 2006/0101616 | A1* | 5/2006 | Horng | E05D 5/12 16/233 |
| 2010/0058557 | A1* | 3/2010 | Wang | G06F 1/1616 16/320 |
| 2010/0071157 | A1* | 3/2010 | Wang | G06F 1/1616 16/297 |
| 2013/0205142 | A1* | 8/2013 | Jung | G06F 1/1677 713/300 |
| 2014/0184489 | A1* | 7/2014 | Ma | G09G 5/37 345/156 |
| 2016/0334835 | A1* | 11/2016 | Tamura | G06F 1/1616 |

FOREIGN PATENT DOCUMENTS

JP  2016-212722 A  12/2016
JP  2017-033116 A   2/2017

* cited by examiner

*Primary Examiner* — Jinhee J Lee
*Assistant Examiner* — Ingrid D Wright
(74) *Attorney, Agent, or Firm* — Shimokaji IP

(57) ABSTRACT

A hinge device can detect an open angle and an opening/closing angular velocity with high responsiveness and simple configuration. The hinge device enables rotary motion of a main-body chassis and a display chassis, and includes a first chassis shaft non-rotatably provided with respect to the main-body chassis, a second chassis shaft non-rotatably provided with respect to the display chassis, a cylindrical body into which the first chassis shaft is inserted to rotate with rotary motion thereof, a ring-type magnet non-rotatably fixed to the cylindrical body, a sensor that detects a movement of the magnet associated with the rotary motion from the change of magnetism, and a controller that reads a signal from the sensor to calculate an open angle and an opening/closing angular velocity.

7 Claims, 9 Drawing Sheets

HINGE DEVICE AND ELECTRONIC APPARATUS

FIELD OF THE INVENTION

The embodiment discussed herein is directed to a hinge device that enables rotary motion of first and second chassis and an electronic apparatus that includes the hinge device.

BACKGROUND OF THE INVENTION

An electronic apparatus, such as a mobile phone and a laptop personal computer (hereinafter, called laptop PC), employs a configuration in which a display chassis is rotatably connected to a main-body chassis by a hinge device.

For example, there has been known a laptop PC that includes hinge devices on a rear end of a main-body chassis to be able to rotate a display chassis from a 0-degree position to a 360-degree position (e.g., see Japanese Patent Application Laid-Open No. 2017-33116). Such a laptop PC improves convenience by employing different modes in accordance with open angles. For example, modes according to the open angles of a hinge include a closed mode of 0 degrees, a laptop mode of about 10 degrees to 190 degrees, a stand mod or a tent mode of about 190 degrees to 350 degrees, and a tablet mode of 360 degrees. Herein, the stand mod is a mode in which a keyboard side of the main-body chassis is made be in contact with a surface of a desk to make a display face a user. The tent mode is a mode in which the main-body chassis and the display chassis are placed on the surface of the desk in the shape of a tent. The tablet mode is a mode in which the display can be used in a state where it is held by a hand of the user while facing a face of the user. Such a laptop PC includes acceleration sensors respectively provided in the main-body chassis and the display chassis to obtain the open angle of the hinge by computation from accelerations detected by the acceleration sensors.

To ensure high operation in the keyboard of the laptop PC, it is necessary to ensure a certain level of keystroke. To avoid causing the display to interfere with the keyboard on the upper surface of the main-body chassis when closing the display chassis while realizing the thinness of the main-body chassis, it is preferable that the keys of the keyboard be automatically depressed when closing the display. Such a key depressing mechanism is disclosed in Japanese Patent No. 5980374.

In the laptop PC disclosed in Japanese Patent Application Laid-Open No. 2017-33116 and Japanese Patent No. 5980374, timings of the switching between modes and the depressing operation of keys are based on an open angle between the main-body chassis and the display chassis. When using acceleration sensors to detect the open angle of the hinge in the laptop PC, response delay occurs because stability and computation of signals require some time. Moreover, in the case of the use for a mobile, an acceleration may be further added as a disturbance in addition to the opening and closing of the hinge, and thus there is a concern to have an influence on detection accuracy. Furthermore, because acceleration sensors are respectively provided in the main-body chassis and the display chassis, a system is complicated.

If a hinge device and an electronic apparatus, which can detect the open angle and the opening/closing angular velocity of a hinge in real time, are realized, it is considered that new use applications are added to the distinction of operation modes as described above, but sensing has response delay under the present situation.

The present invention has been made in consideration of the above problem, and an object of the invention is to provide a hinge device that can detect at least one of an open angle and an opening/closing angular velocity with high responsiveness and simple configuration and an electronic apparatus that includes the hinge device.

SUMMARY OF THE INVENTION

To solve the problem described above and achieve the object, a hinge device according to the first aspect of the present invention enables rotary motion of first and second chassis, and includes a rotating shaft that rotates with the rotary motion; a magnet that is non-rotatably fixed to the rotating shaft; a sensor that detects a movement of the magnet associated with the rotary motion from a change of magnetism; and a controller that reads a signal from the sensor to calculate at least one of an open angle and an opening/closing angular velocity of the first and second chassis.

The hinge device may further include a first chassis shaft non-rotatably provided with respect to the first chassis, and the rotating shaft may include a cylindrical body into which the first chassis shaft is rotatably inserted and rotate relative to the first chassis shaft with the rotary motion.

The sensor may be fixed inside the first chassis.

The magnet may be placed inside the first chassis.

The cylindrical body may include a step for rotation stop that supports the magnet from an axial-direction lateral side.

The hinge device may further include a second chassis shaft non-rotatably provided with respect to the second chassis; a link that holds the first and second chassis shafts in parallel; and a synchronization part that synchronously rotates the first and second chassis shafts in directions opposite to each other.

Moreover, an electronic apparatus according to the second aspect of the present invention includes the hinge device described above.

The first chassis or the second chassis may include a keyboard that includes a plurality of keys; a key depressing mechanism that depresses the keys; and a motor that drives the key depressing mechanism, and the controller may drive the motor based on at least one of the open angle and the opening/closing angular velocity.

The controller may change a state of at least one of an input device and an output device based on the opening/closing angular velocity.

Effects of the Invention

A hinge device and an electronic apparatus according to the above-described aspects of the present invention include a rotating shaft that rotates with the rotary motion of first and second chassis, a magnet that is non-rotatably fixed to the rotating shaft, a sensor that detects a movement of the magnet from the change of magnetism, and a controller, and thus can detect at least one of an open angle and an opening/closing angular velocity with high responsiveness in spite of such a simple configuration.

DETAILED DESCRIPTION OF THE INVENTION

Hereinafter, an embodiment of a hinge device and an electronic apparatus according to the present invention will be explained in detail with reference to the drawings. In addition, the embodiment disclosed below is not intended to limit the present invention. The embodiment of the present invention is directed to a hinge device 12R and an electronic apparatus 10 that includes the hinge device 12R.

Figure 1:
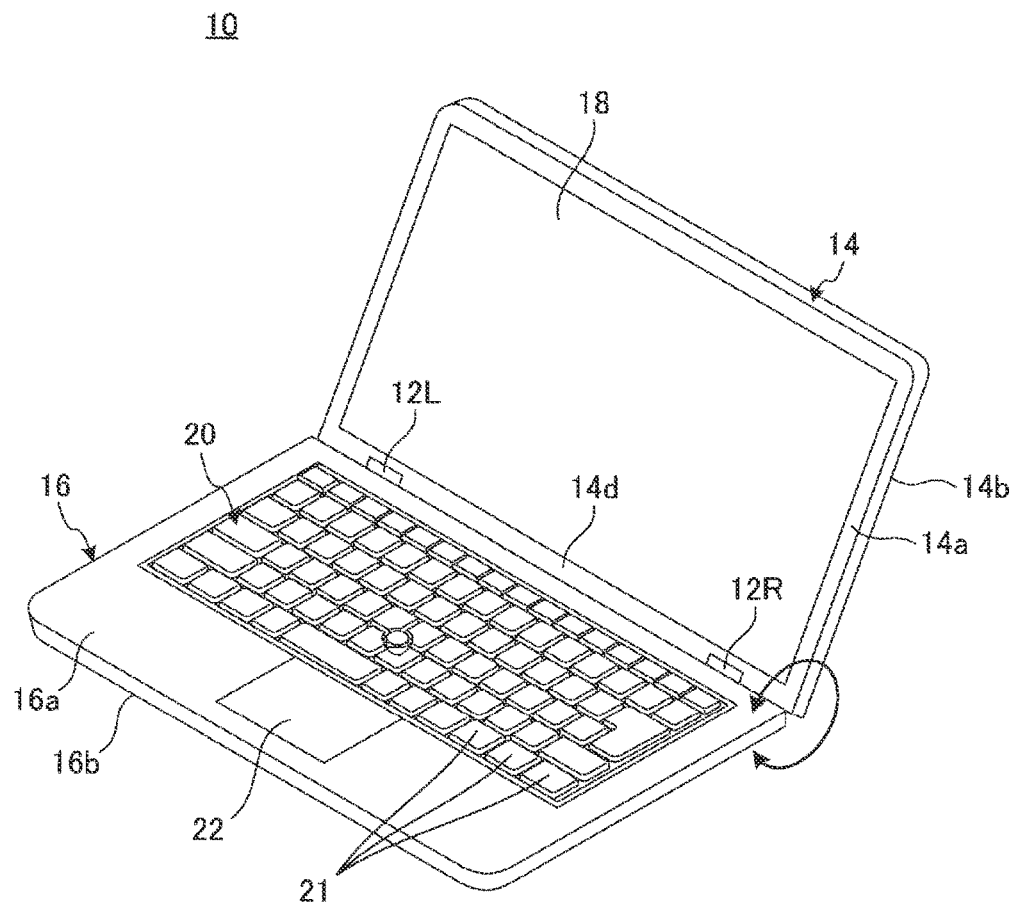
FIG. 1 is a perspective diagram of an electronic apparatus according to an embodiment.
Figure 2A:
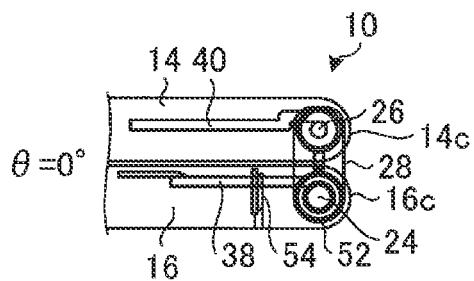
FIGS. 2A to 2E are schematic side views obtained by expanding a portion of the electronic apparatus, in which, for an open angle between a main-body chassis and a display chassis, 2A illustrates a state of 0 degrees, 2B illustrates a state of 90 degrees, 2C illustrates a state of 180 degrees, 2D illustrates a state of 270 degrees, and 2E illustrates a state of 360 degrees.
Figure 2B:
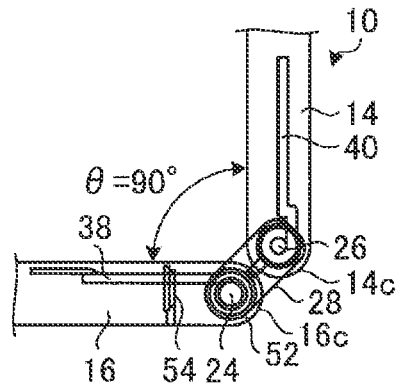
Figure 2C:
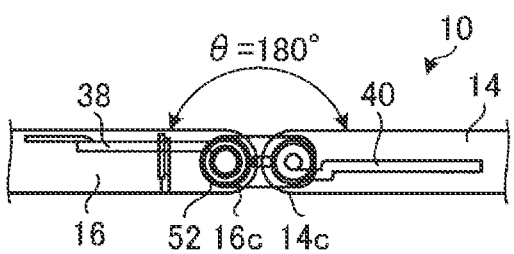
Figure 2D:
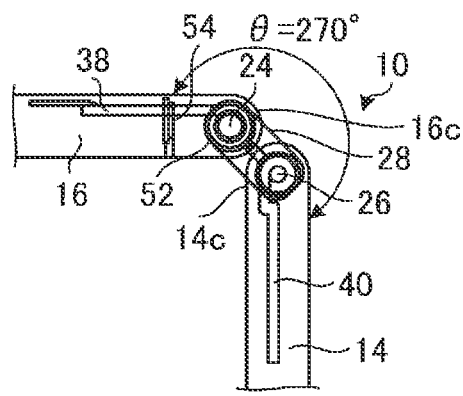
Figure 2E:
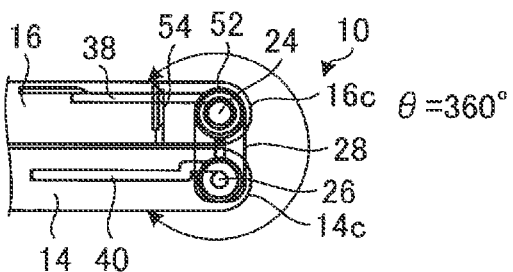

FIG. 1 is a perspective diagram of the electronic apparatus 10 that includes hinge devices 12L and 12R. FIG. 1 illustrates a usage pattern of a laptop PC in which a display chassis (second chassis) 14 is opened from a main-body chassis (first chassis) 16 by using the hinge devices 12L and 12R. FIGS. 2A to 2E are schematic side views obtained by expanding a portion of the electronic apparatus 10 at angular positions when the display chassis 14 of the electronic apparatus 10 illustrated in FIG. 1 is rotated relative to the main-body chassis 16. The open angle is 0 degrees in a state where the main-body chassis 16 and the display chassis 14 are closed (see FIG. 2A) in such a manner that a display 18 (see FIG. 1) and a keyboard 20 (see FIG. 1) face each other. The open angle is 360 degrees in a state where these chassis are opened (see FIG. 2E) in such a manner that the display 18 and the keyboard 20 are directed to opposite sides by the relative rotation of the main-body chassis 16 and the display chassis 14. Hereinafter, an open angle of the display chassis 14 with respect to the main-body chassis 16 is defined as "θ", and an opening/closing angular velocity thereof is defined as "ω".

Based on the open angle θ of the display chassis 14 with respect to the main-body chassis 16, the electronic apparatus 10 according to the embodiment automatically changes a mode to one of a closed mode, a laptop mode, a stand mod, a tent mode, and a tablet mode. Depending on a mode, the electronic apparatus 10 selects the display/non-display of the display 18, the display direction of the display 18, and the validity/invalidity of the keyboard 20 and a touch pad 22.

As illustrated in FIGS. 1 and 2A-2E, the electronic apparatus 10 is configured to rotatably connect a rear end 14c of the display chassis 14 of which a surface 14a has the display 18 and a rear end 16c of the main-body chassis 16 of which a surface 16a has the keyboard 20 by using a left-and-right pair of the hinge devices 12L and 12R.

The display chassis 14 is configured in a tabular shape to be thinner than the main-body chassis 16. The display chassis 14 is coupled to the main-body chassis 16 by using the hinge devices 12L and 12R provided in the rear end 16c, and is electrically connected to the main-body chassis 16 by using a cable (not illustrated) passing through at least one of the hinge devices 12L and 12R. The display 18 is configured of a touch-panel liquid crystal display device, for example, and is surrounded by a frame 14d.

The main-body chassis 16 is configured in the shape of a flat box. The main-body chassis 16 is coupled to the display chassis 14 by using the hinge devices 12L and 12R provided in the rear end 14c. Input means such as the keyboard 20 and the touch pad 22 are provided on the surface 16a of the main-body chassis 16, and various types of electronic components such as a board, a calculation device, and a memory are provided inside the main-body chassis 16. For example, these components are included in a controller to be described later. Moreover, a key depressing mechanism 70 (see FIGS. 6A and 6B) that depresses keys 21 constituting the keyboard 20 is provided in the main-body chassis 16. The key depressing mechanism 70 will be described below.

As illustrated in FIGS. 2A to 2E, the hinge devices 12L and 12R enable rotary motion from a 0-degree position to a 360-degree position of the display chassis 14 by employing a biaxial structure.

Figure 3:
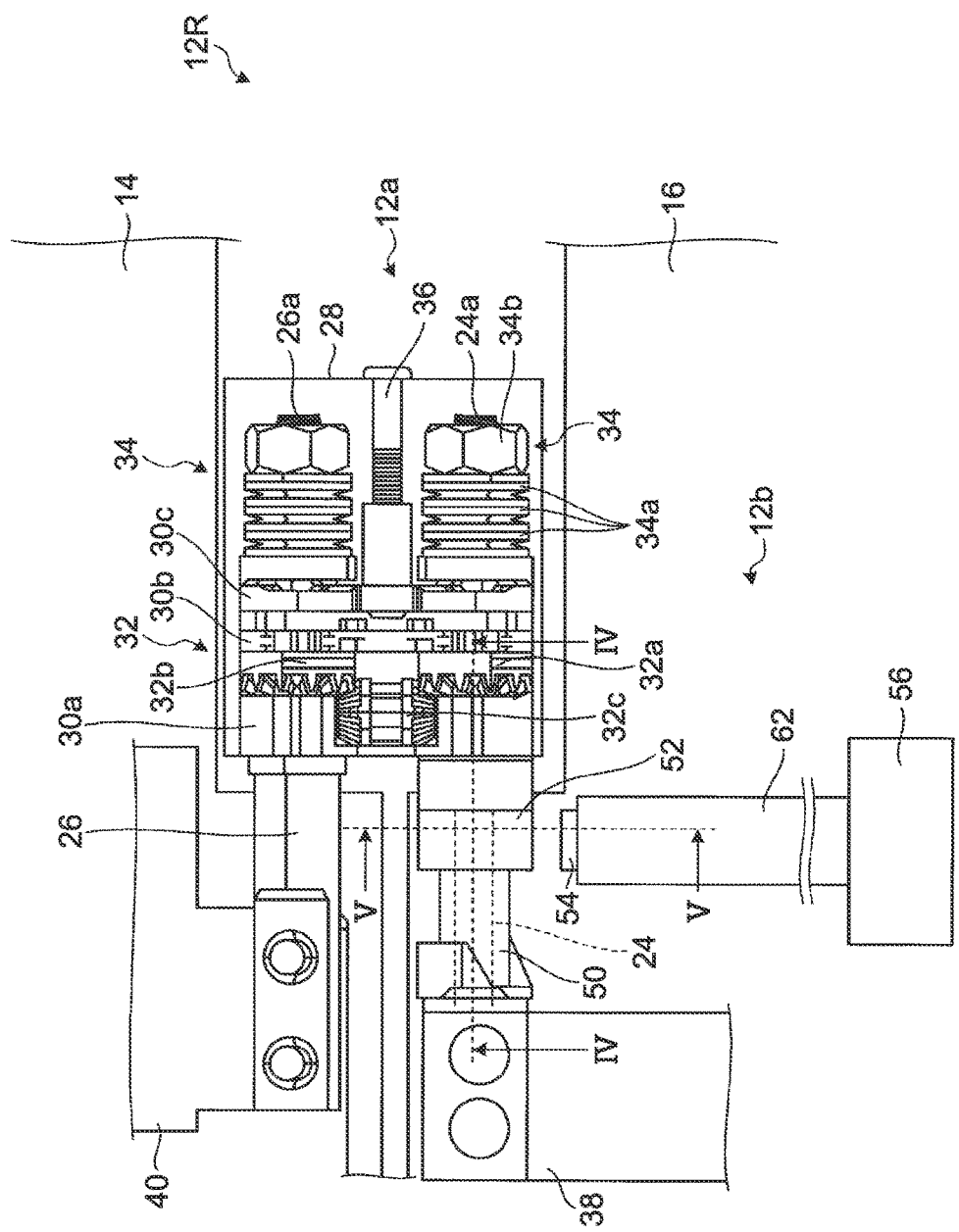
FIG. 3 is a schematic diagram of a hinge device according to the embodiment.

As illustrated in FIG. 3, the hinge device 12R includes a mechanical part 12a and a sensing part 12b. The mechanical part 12a includes a first chassis shaft 24 that is non-rotatably coupled to the main-body chassis 16, a second chassis shaft 26 that is non-rotatably coupled to the display chassis 14, and a hinge chassis 28 that rotatably holds the first chassis shaft 24 and the second chassis shaft 26.

The mechanical part 12a further includes links 30a, 30b, and 30c that hold the first chassis shaft 24 and the second chassis shaft 26 to be parallel to each other, a synchronization part 32 that synchronously rotates the first chassis shaft 24 and the second chassis shaft 26 in directions opposite to each other, torque generating parts 34 that are respectively provided in the first chassis shaft 24 and the second chassis shaft 26, and a fixing part 36 that fixes the link 30c to the hinge chassis 28.

A main-body connecting plate 38 is fixed to a left end of the first chassis shaft 24 in a screwing manner. The main-body connecting plate 38 is screwably fixed to the main-body chassis 16, and thus the first chassis shaft 24 cannot be rotated with respect to the main-body chassis 16. A display connecting plate 40 is fixed to a left end of the second chassis shaft 26 in a screwing manner. The display connecting plate 40 is screwably fixed to the display chassis 14, and thus the second chassis shaft 26 cannot be rotated with respect to the display chassis 14.

The links 30a, 30b, and 30c are arranged in parallel from left to right to hold the first chassis shaft 24 and the second chassis shaft 26 in parallel. The link 30a is slightly thick, and the links 30b and 30c are slightly thin. The link 30a is provided at a substantially intermediate position of the first chassis shaft 24 and the second chassis shaft 26.

The synchronization part 32 includes a first bevel gear 32a that is non-rotatably provided with respect to the first chassis shaft 24, a second bevel gear 32b that is non-rotatably provided with respect to the second chassis shaft 26, and an intermediate bevel gear 32*c* that is engaged with the first bevel gear 32*a* and the second bevel gear 32*b*. The first bevel gear 32*a* and the second bevel gear 32*b* respectively have tooth surfaces pointed to left, and substantially abut on a right side of the link 30*a*. The intermediate bevel gear 32*c* has both ends that are supported by the link 30*a*, and is provided in a direction perpendicular to the first chassis shaft 24 and the second chassis shaft 26 in a state where the tooth surfaces of both ends are engaged with the first bevel gear 32*a* and the second bevel gear 32*b*. The synchronization part 32 may employ, for example, a helical gear other than a bevel gear.

The torque generating parts 34 are respectively provided in thread parts 24*a* and 26*a* of the right portions of the first chassis shaft 24 and the second chassis shaft 26, and include a plurality of flat springs 34*a* and nuts 34*b*. Because the flat springs 34*a* are placed between the link 30*b* and the nut 34*b* and the nuts 34*b* are threadedly engaged with the thread parts 24*a* and 26*a* to be tightened, the torque generating parts 34 can generate friction torque by compression. As a result, the open angle θ between the main-body chassis 16 and the display chassis 14 is stably maintained.

The fixing part 36 screwably fixes the link 30*c* and the hinge chassis 28. The hinge chassis 28 covers the right half of the mechanical part 12*a*, namely, the links 30*a*, 30*b*, 30*c*, the synchronization part 32, the torque generating parts 34, and the fixing part 36. The left half of the first chassis shaft 24 is placed inside the main-body chassis 16. Similarly, the left half of the second chassis shaft 26 is placed inside the display chassis 14. As described above, the first chassis shaft 24 and the second chassis shaft 26 are maintained by the links 30*a*, 30*b*, and 30*c* in parallel, and are arranged in a direction along the connected surfaces of the main-body chassis 16 and the display chassis 14 by the main-body connecting plate 38 and the display connecting plate 40. Thus, the chassis shafts act as base shafts of rotary motion of the main-body chassis 16 and the display chassis 14. Moreover, because the first chassis shaft 24 and the second chassis shaft 26 are synchronously rotated by the synchronization part 32 in directions opposite to each other, an open angle θ2 between the links 30*a*, 30*b*, 30*c* and the hinge chassis 28 is a half angle of the open angle θ. For example, when the open angle θ is 90 degrees, the open angle θ2 is 45 degrees (see FIG. 2A). In addition, the mechanical part 12*a* is also provided in the hinge device 12L to have a symmetric structure. The sensing part 12*b* is provided in the hinge device 12R, but it may be provided in the hinge device 12L.

Figure 4:
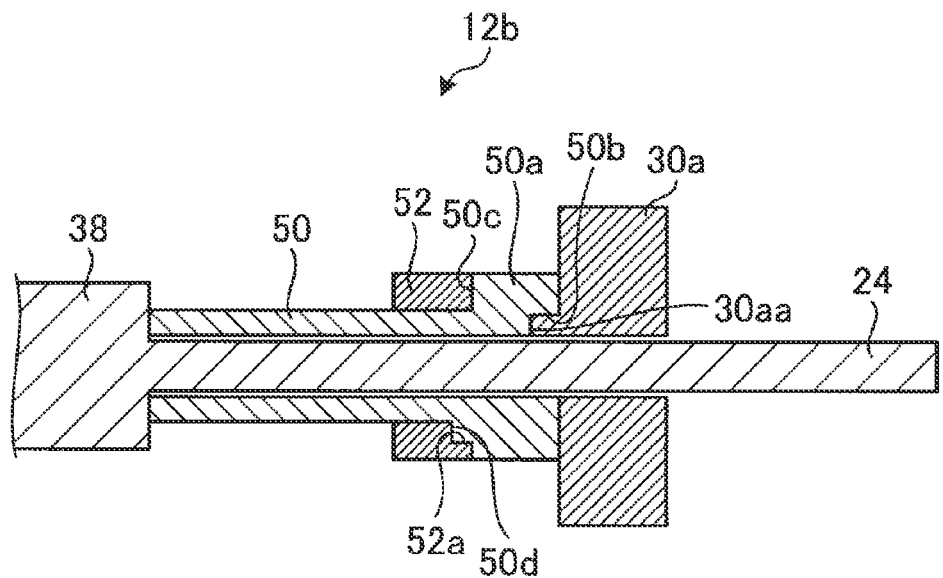
FIG. 4 is a cross-sectional diagram viewed from a line IV to IV illustrated in FIG. 3.
Figure 5:
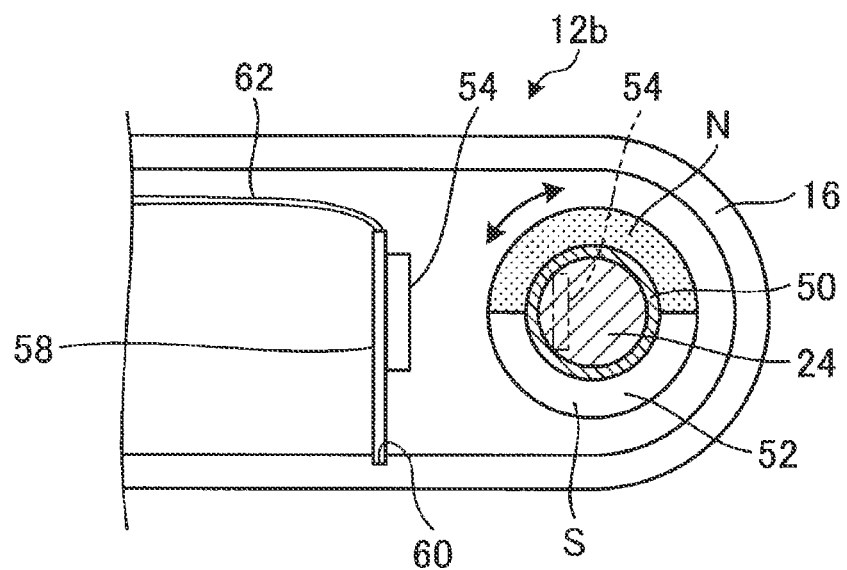
FIG. 5 is a cross-sectional diagram viewed from a line V to V illustrated in FIG. 3.

As illustrated in FIGS. 3 to 5, the sensing part 12*b* includes a cylindrical body (rotating shaft) 50 into which the first chassis shaft 24 is rotatably inserted, a magnet 52 into and to which the cylindrical body 50 is non-rotatably inserted and fixed, a sensor 54 that detects rotation (movement) of the magnet 52 from the change of magnetism, and the controller 56 that reads signals from the sensor. All of the magnet 52, the sensor 54, and the controller 56 are provided inside the main-body chassis 16. The magnet 52 may be fixed to the cylindrical body 50 in a configuration other than external insertion. For example, the magnet 52 may be embedded as part of the cylindrical body 50.

The cylindrical body 50 extends from the right end of the main-body connecting plate 38 to the left side of the link 30*a* while surrounding the first chassis shaft 24. A base end 50*a* having a slightly large diameter is provided on the right end of the cylindrical body 50. The base end 50*a* includes one or more recessed portions 50*b* provided on the right side and one or more protrusions 50*d* provided on a left-side step 50*c*.

Herein, protrusions 30*aa* of which the number and positions correspond to the number and positions of the recessed portions 50*b* are provided on the left side of the link 30*a*. Positioning and rotation stop of the cylindrical body 50 is performed by tightly fitting the protrusions 30*aa* into the recessed portions 50*b*. Moreover, recessed portions 52*a* of which the number and positions correspond to the number and positions of the protrusions 50*d* are provided on the right side of the magnet 52. The step 50*c* supports and stabilizes the magnet 52 from an axial-direction lateral side, and further the protrusions 50*d* are tightly fitted into the recessed portions 52*a*, so as to perform positioning and rotation stop of the magnet 52. The link 30*a*, the base end 50*a*, and the magnet 52 are fixed by a fixing member, for example, an adhesive that does not have an influence of heat on magnetism, and the magnet 52 integrally rotates with the link 30*a*. In other words, with the rotary motion of the main-body chassis 16 and the display chassis 14, the cylindrical body 50 and the magnet 52 rotate relative to the main-body chassis 16 and the first chassis shaft 24. To form the basis of operations in the hinge device 12R is the link 30*a*, but the magnet 52 stably rotates without axial runout because the magnet is arranged at a position close to the link 30*a*.

As illustrated in FIG. 5, the magnet 52 is a small ring-type magnet and is magnetized in a radial direction. In FIG. 5, the magnet is magnetized in up and down directions. For distinction, a north pole is a dotted area and a south pole is a white area. In an assembly process of the electronic apparatus 10, the magnet 52 is first inserted into the cylindrical body 50 and further is fixed to the link 30*a* by easily performing angle adjustment by using an external magnet jig. The magnet 52 is not necessarily limited to a ring-type magnet.

The sensor 54 is a small magnetism detecting sensor, and is placed near the magnet 52 in its radial direction in a direction and at a position in and at which the magnetism of the magnet 52 can be changed. The sensor 54 is arranged at a position sufficiently close to the magnet 52, and thus the range of magnetism to be detected is increased and a detection accuracy is improved. The power consumption of the sensor 54 is small. The sensor 54 is provided on a small board 58, and the small board 58 is inserted into a mounting hole 60 inside the main-body chassis 16 to be positioned and fixed thereto. The signals of the sensor 54 are supplied to the controller 56 via a flexible board 62. The controller 56 is a main board in the electronic apparatus 10, and can make a processor such as CPU (central processing unit) execute a program. The controller 56 may be realized by hardware such as IC (integrated circuit) or may be realized by a combination of software and hardware.

The controller 56 calculates an open angle θ2 and an opening/closing angular velocity ω2 of the magnet 52 and the link 30*a* based on a signal supplied from the sensor 54, and further doubles the open angle θ2 and the opening/closing angular velocity ω2 to obtain an open angle θ and an opening/closing angular velocity ω. This calculation is performed by performing an offset process on the signal obtained from the sensor 54 and then performing constant multiplication on the result after the offset process. The opening/closing angular velocities ω and ω2 are calculated by differentiating the open angle θ and θ2. In these calculations, a result is instantly obtained because its computational amount is very little. Depending on a use application and a condition, only one of the open angle θ and the opening/closing angular velocity ω may be obtained. In addition, an offset value and a constant value are calibrated and recorded at the time of product shipment so that θ is 0 degrees in the state illustrated in FIG. 2A and/or so that θ is 360 degrees in the state illustrated in FIG. 2E, for example.

In the hinge device 12R and the electronic apparatus 10 as thus constituted, the sensor 54 detects rotation of the magnet 52 interlocking with an opening/closing operation by using the change of magnetism, and supplies its signal to the controller 56. As a result, the open angle θ and the opening/closing angular velocity ω can be calculated in real time without response delay.

The magnet 52 and the sensor 54 are compact to be able to be arranged on the first chassis shaft 24 and in the vicinity thereof because they are sufficiently small. Furthermore, they can be placed inside the main-body chassis 16 and thus are hard to be affected by disturbance magnetism such as earth magnetism. Because the magnet 52 does not require a power supply, it is suitable to attach the magnet to the cylindrical body 50 that is a movable part.

In the hinge device 12R and the electronic apparatus 10, because the state of the open angle θ=0 degrees where the display chassis 14 is closed can be detected, the dedicated sensor and switch for a closed mode are not required. Moreover, even if the electronic apparatus 10 is moved, its acceleration does not influence the detection of the open angle θ and the opening/closing angular velocity ω and thus the magnet and sensor according to the embodiment are suitable for a mobile.

Because the sensor 54 and the controller 56 are together provided inside the main-body chassis 16, the flexible board 62 connecting both is not basically moved to be stable and thus bending resistance does not matter. Because the sensing part 12b in the hinge device 12R is totally arranged inside the main-body chassis 16, layout design in the display chassis 14 has a high degree of freedom and thus the display chassis 14 can be thinned. Moreover, the frame 14d can be narrowed when viewed from the front side, and the display 18 can be broadened that much. Needless to say, depending on a use application and a condition, the sensing part 12b may be provided inside the display chassis 14. Because the sensor 54 detects magnetism of the magnet 52 with non-contact, a lifetime is long without having a sliding part and a movable part for sensing. As illustrated by an imaginary line of FIG. 5, the sensor 54 may be provided inside the first chassis shaft 24.

Because the open angle θ and the opening/closing angular velocity ω are obtained with good responsiveness in the hinge device 12R, they are suitable for the following use application specifically. For example, the embodiment enables quick mode switching without response delay when automatically switching between a closed mode, a laptop mode, a stand mod, a tent mode, and a tablet mode. Moreover, sound setting can be quickly performed based on the open angle θ, for example.

Furthermore, because the dynamic opening/closing angular velocity ω as well as the static open angle θ can be calculated in the hinge device 12R and the electronic apparatus 10, composite control based on the open angle θ and the opening/closing angular velocity ω is enabled. For example, when the display chassis 14 is closed at the time of a tablet mode in the open angle θ=360 degrees, a mode is first shifted to a stand mod or a tent mode in accordance with the open angle θ. However, when the opening/closing angular velocity ω is sufficiently large, the embodiment may modify earlier a threshold of mode switching and perform mode switching in advance. Moreover, when the opening/closing angular velocity ω is sufficiently large, the embodiment may pass a stand mod and a tent mode to be shifted to a laptop mode in advance. When the opening/closing angular velocity ω is further large, the embodiment may also pass a laptop mode to be shifted to a closed mode in advance. As a result, unnecessary mode switching can be omitted.

Even though the open angle θ is a small value that originally corresponds to a closed mode for example, a laptop mode may be maintained while the opening/closing angular velocity ω is being changed with a sufficiently small value or when the opening/closing angular velocity ω is stopped behind a sufficiently small value. This is because it is considered that a user has an intention not to completely close the apparatus.

Furthermore, control may be performed based on only the opening/closing angular velocity ω regardless of the open angle θ. For example, upon lightly moving the display chassis 14 to generate the opening/closing angular velocity ω, setting of an input device or an output device may be modified based on the size and direction and the number of times. When illustrating some examples, a sleep mode and a release command thereof can be set by tapping the display chassis 14. Upon moving the display chassis 14 in its front or its back, based on the size of the opening/closing angular velocity ω at that time, there can be performed volume adjustment of a speaker, zooming of an image, size adjustment of a window, brightness control of a screen, switching of an active window, switching of a cursor moving speed and a double click speed, and substitution of a lever operation in a game. Such the operations may be performed while pushing the predetermined key 21 of the keyboard 20, or may be activated only during executing a predetermined application. Needless to say, these operations may be performed by using only the opening/closing angular velocity ω, or may be performed by using only the open angle θ. Alternatively, these operations may be performed by using a combination of both. Furthermore, these operations may be performed by using a combination of both and a signal of another sensor such as an acceleration sensor.

Next, the key depressing mechanism 70 provided in the main-body chassis 16 will be explained with reference to FIGS. 6A, 6B, and 7. The key depressing mechanism 70 is a mechanism configured to hold a key top 72 of each of the keys 21 constituting the keyboard 20 at a depressed position depending on the open angle θ and further release its depressed state. First, the keys 21 as a target to be depressed in the key depressing mechanism 70 will be explained. The keys 21 are arrayed on the surface 16a of the main-body chassis 16 to be arranged in front-back and right-left directions. For example, six lines are provided in front and back (see FIG. 1). A frame (cosmetic frame) 74 to fill space around the key top 72 forming an operating surface of each of the keys 21 is provided on the surface 16a. The adjacent key tops 72 are partitioned by the frame 74, and each partitioned portion has an independent configuration.

Figure 6A:
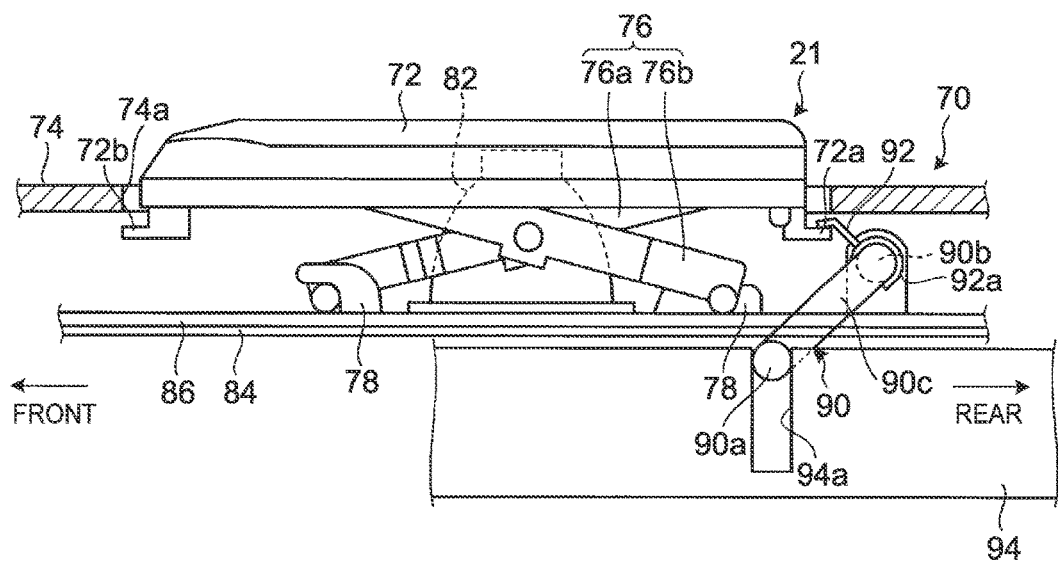
FIGS. 6A and 6B are diagrams explaining operations of a key performed by a key depressing mechanism, in which 6A is a side view at a use position at which a key top is located uppermost and 6B is a side view at a depressed position at which the key top is located lowermost.

As illustrated in FIG. 6A, a plurality of holes 74a into which the key top 72 is inserted is formed in the frame 74. The frame 74 is mounted onto the main-body chassis 16 so that the frame is located at a position substantially flush with or slightly lower than the surface 16a of the main-body chassis 16.

The key 21 includes the key top 72 (hereinafter, may be simply referred to as the key 21), a guide mechanism 76 configured to support and guide the key top 72, a pair of front and back locking pieces 78 to attach the guide mechanism 76, and a rubber dome 82. The key 21 is mounted onto a base plate 84. All the keys 21 arranged in the keyboard 20 share one piece of the base plate 84. A membrane sheet 86 is provided on the upper surface of the base plate 84. The membrane sheet 86 is a trilayer structure switch sheet in which a contact point is closed when being pressed, for example, and is stacked on the base plate 84.

The key top 72 is an operating member for inputting a signal, and is placed via the guide mechanism 76 above the base plate 84. A receiving piece 72a is projectingly formed toward the rear on the lateral side of the rear end of the key top 72, and a protruding piece 72b is projectingly formed toward the front on the lateral side of the front end. The rubber dome 82 is an elastic member that presses the membrane sheet 86 when the key top 72 is depressed and returns the key top 72 to an original position when the depressing operation of the key top 72 is released. The rubber dome 82 is placed between the membrane sheet 86 and the key top 72. In FIG. 6B, the rubber dome 82 is omitted.

The guide mechanism 76 supports the key top 72 ascendably and descendably, and is foldably attached between the base plate 84 and the key top 72. The guide mechanism 76 has a pantograph structure including an inner frame 76a and an outer frame 76b attached in the shape of brace, for example. In the inner frame 76a, a front-lower-end axial member is locked into the locking piece 78 movably and rotatably in a front-back direction, and a rear-upper-end axial member that is not illustrated is supported unmovably and rotatably on a locking part (not illustrated) formed on the rear inner surface of the key top 72. In the outer frame 76b, a rear-lower-end axial member is locked into the locking piece 78 movably and rotatably in a front-back direction, and a front-upper-end axial member that is not illustrated is supported unmovably and rotatably on a locking part (not illustrated) formed on the rear inner surface of the key top 72.

Next, the key depressing mechanism 70 that holds the key tops 72 of the keys 21 at a depressed position and further releases the depressed state will be explained below.

Figure 6B:
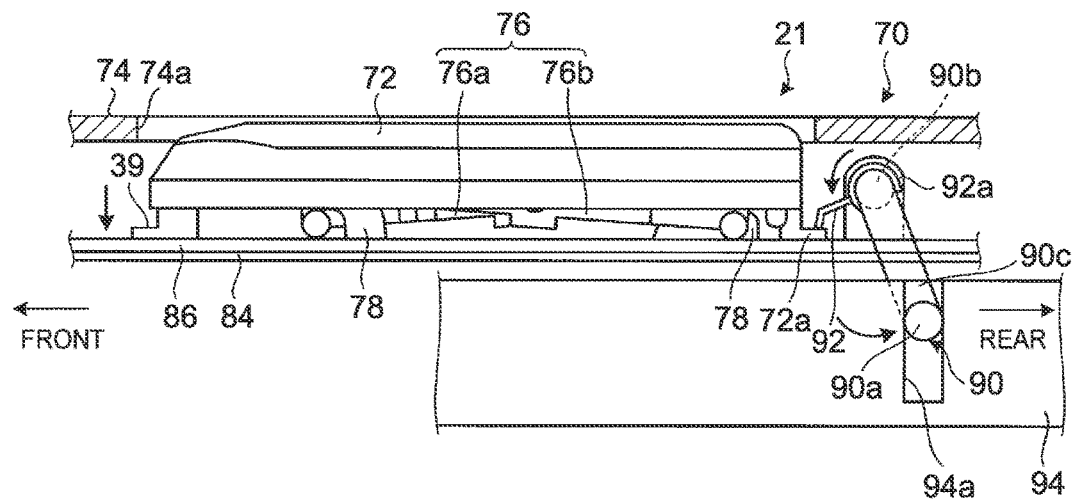

As illustrated in FIGS. 6A and 6B, the key depressing mechanism 70 includes a rotation axis member 90 and a pressing piece 92. The rotation axis member 90 is provided along rear portions of the key tops 72. The pressing piece 92 protrudes from an outer circumferential surface of the rotation axis member 90 to the key tops 72 toward the front side to be placed to abut on the upper surface of the receiving piece 72a of each of the key tops 72 and can press the receiving piece 72a toward the lower side. The pressing piece 92 is bent from a mounting cylindrical body outwardly fixed onto the outer circumferential surface of a base 90b of the rotation axis member 90 to protrude from the outer circumferential surface of the base 90b toward the key top 72.

Figure 7:
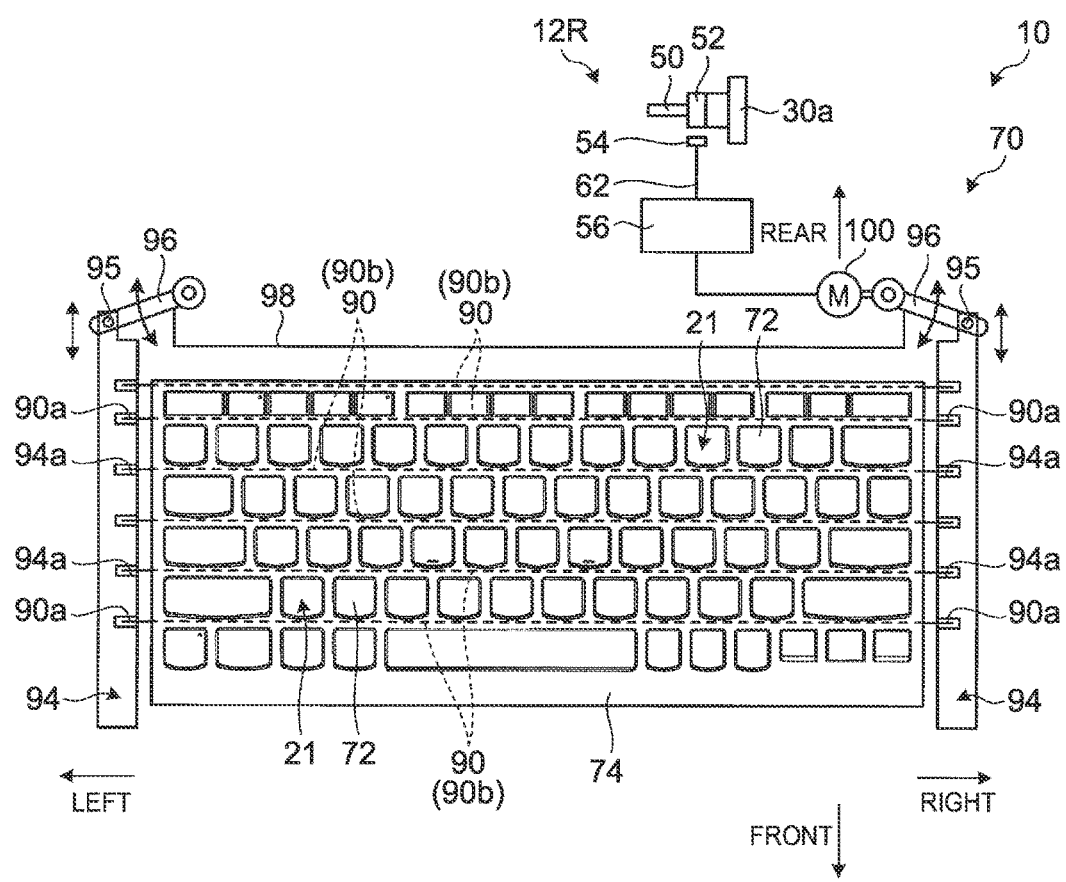
FIG. 7 is a plan view schematically illustrating the configuration of the key depressing mechanism.

As illustrated in FIGS. 6A, 6B, and 7, the rotation axis member 90 includes the linear base 90b that extends along the rear portions of the key tops 72 in the right-left direction and a drive end 90 that is provided on both ends of the base 90b. The drive end 90a is formed by bending by 90 degrees the leading end of an arm portion 90c formed by bending the end of the base 90b by 90 degrees to protrude in the right-left direction to be parallel to the base 90b. As a result, both ends of the rotation axis member 90 have the shape of a crank.

As illustrated in FIG. 7, the rotation axis member 90 includes a plurality of rotation axis members that are arranged in the front-back direction of the keyboard 20 and of which each is provided along the rear portions of the key tops 72 arranged in the right-left direction of the keyboard 20. In case of the present embodiment, because the key tops 72 have six lines in the front-back direction, the rotation axis member 90 also includes six rotation axis members. The rotation axis member 90 is a hard wire rod (wire) formed of SUS materials or the like, for example, and has sufficient rigidity as around 1 mm in diameter for example.

The key depressing mechanism 70 further includes slide members 94 that are respectively provided on the left and right sides of the keyboard 20, a pair of swing members 96 that drives the slide members 94, an interlocking mechanism 98 that interlocks the pair of swing members 96, and a motor 100 that drives the swing members 96.

Each of the slide members 94 that is a long board member provided retractably in the front-back direction is provided with slits 94a of which each engages with the corresponding drive end 90a. The number of the slits 94a is the same as that of the rotation axis members 90. Each of the slits 94a has a depth allowing the swing of the corresponding drive end 90a that is caused by the rotation of the corresponding rotation axis member 90 (see FIGS. 6A and 6B). In the rotation axis member 90, the drive end 90a on both ends thereof is stretched between the left and right slits 94a.

In the pair of swing members 96, pins 95 of the slide members 94 respectively engage with long holes that is not illustrated. At least one of the swing members 96 is swingably driven by the motor 100 to be able to advance and retract the slide members 94. The slide members 94 are synchronously interlocked by the interlocking mechanism 98 to perform a symmetric operation. For example, the interlocking mechanism 98 is realized by one of a wire, a link, and a gear, or a combination thereof. The motor 100 rotates under the operation of the controller 56 to swing the swing members 96. The motor 100 can perform forward rotation/inverse rotation under the operation of the controller 56, and can further control a rotating speed. The motor 100 is decelerated by a speed reducer to obtain a moderate rotating speed and a sufficient torque.

In the key depressing mechanism 70 as thus constituted, when the slide member 94 is forward located as illustrated in FIG. 6A, the drive end 90a is also placed by the slit 94a forward. At this time, the arm portion 90c is located in the direction of seven o'clock, the pressing piece 92 is located upward, and the receiving piece 72a is not depressed. Therefore, the key 21 is located at a normal use position, and thus enable a depressing operation by hands.

On the other hand, when the slide member 94 is located backward as illustrated in FIG. 6B, the drive end 90a is also placed backward by the slit 94a. At this time, the arm portion 90c is located in the direction of five o'clock, the pressing piece 92 becomes downward, and the receiving piece 72a is depressed by the pressing piece 92. Therefore, the key 21 is retracted to a lower depressed position than the surface of the frame 74, and thus do not interfere with the display 18 even if the display chassis 14 is closed for example.

According to the key depressing mechanism 70, the keys 21 are automatically depressed to avoid interfering with the display 18 when closing the display chassis 14. Moreover, because the keys 21 are not used even in a stand mod, a tent mode, and a tablet mode, the keys 21 can be depressed by the key depressing mechanism 70. In particular, because the surface 16a of the main-body chassis 16 acts as the lower side in the stand mod, the keys 21 can be depressed by the key depressing mechanism 70 in order to avoid the contact of the keys 21 with the placement surface.

The front-back widths of the plurality of slits 94a and drive ends 90a are approximately equal, and they are formed without substantial interspace, but the front-back width of the slits 94a may be changed in accordance with the place depending on a specification or condition. If it is done in this way, a gap between the slit 94a and the drive end 90a has different values depending on the place, and thus the operation timing for each line of the keys 21 can be changed. When employing such a time difference structure, because loads applied to the members of the key depressing mechanism 70 are dispersed temporally, the loads are reduced and thus miniaturization and thinness can be more achieved. Moreover, upon employing such a time difference structure, when the display chassis 14 starts to be opened from a 0-degree position for example, upward moving like a wave is performed in sequence from the key tops 72 located on the front line in accordance with the increase of the opening angle of the display chassis 14 so as to return the keys to a use position. Similarly, for example, when the display chassis 14 starts to be closed from a 90 degrees position, downward moving like a wave is performed in sequence from the key tops 72 located on the rear line in accordance with the decrease of the opening angle of the display chassis 14 so as to hold the keys at a depressed position, and thus a visual dramatic impact can be provided to a user.

Meanwhile, based on a signal supplied from the sensor 54, the controller 56 calculates the open angle $\theta$ and the opening/closing angular velocity $\omega$. Furthermore, based on the open angle $\theta$ and the opening/closing angular velocity $\omega$, the controller 56 can drive the motor 100. Therefore, the key depressing mechanism 70 enables various operations based on the open angle $\theta$ and the opening/closing angular velocity $\omega$. Hereinafter, two control procedures of the key depressing mechanism 70 by the controller 56 will be illustrated. Hereinafter, to make explanation simple, it is supposed that the sensor 54 directly detects the open angle $\theta$ obtained by doubling the open angle $\theta 2$ instead of the open angle $\theta 2$.

Figure 8:
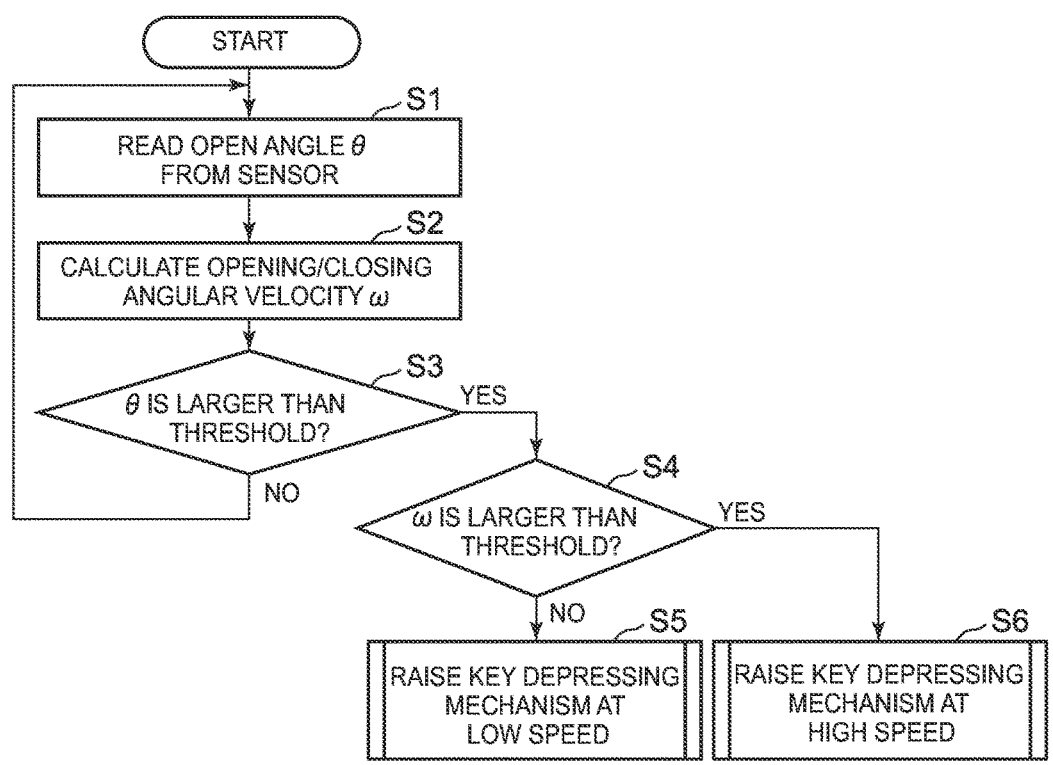
FIG. 8 is a flowchart illustrating a first control procedure of the key depressing mechanism.

In the control procedure illustrated in FIG. 8, when opening the display chassis 14 from the state of the open angle $\theta=0$ degrees (see FIG. 2A), depression onto the keys 21 located at the depressed position is released to raise the keys 21. First, in Step S1, the controller reads a signal indicative of an open angle $\theta$ from the sensor 54.

In Step S2, the controller calculates an opening/closing angular velocity $\omega$ based on the open angle $\theta$. As described above, the opening/closing angular velocity $\omega$ is calculated by differentiating the open angle $\theta$. More specifically, the opening/closing angular velocity $\omega$ is calculated as a difference between the previous value and the present value of the open angle $\theta$.

In Step S3, the controller compares the open angle $\theta$ with a threshold, and moves to Step S4 when being larger than the threshold (S3: Yes) and returns to Step S1 when being not more than the threshold (S3: No). The threshold herein is an operation start angle of the key depressing mechanism 70. When the open angle $\theta$ becomes larger than the threshold, the controller starts to raise the keys 21.

In Step S4, the controller compares the opening/closing angular velocity $\omega$ with a threshold, and moves to Step S6 when being larger than the threshold (S4: Yes) and moves to Step S5 when being not more than the threshold (S4: No). In addition, because the opening/closing angular velocity $\omega$ in this case is an opening-direction velocity of the display chassis 14, the threshold is a value defined in consideration of a polarity.

In Step S5, namely, when the opening/closing angular velocity $\omega$ is not more than the threshold, the controller raises the key depressing mechanism 70 at low speed. In other words, because the operation of the display chassis 14 is slow in this case, the keys 21 may be raised at low speed in accordance with the operation speed, and thus the drive voltage of the motor 100 is set to a small value. As a result, the gear noise and mechanical load of the motor 100 can be reduced.

On the other hand, in Step S6, namely, when the opening/closing angular velocity $\omega$ is larger than the threshold, the controller raises the key depressing mechanism 70 at high speed. In other words, because the operation of the display chassis 14 is fast in this case, it is preferable to also raise the keys 21 at high speed in accordance with the operation speed, and thus the drive voltage of the motor 100 is set to a large value. As a result, the controller can quickly raise the keys 21 in accordance with a user's operation.

In the control procedure of FIG. 8, in Step S4, the opening/closing angular velocity $\omega$ is divided into two cases based on a threshold, but the embodiment is not limited to this. The opening/closing angular velocity $\omega$ may be divided into three or more cases, or may be continuously changed. Moreover, the control procedure of FIG. 8 indicates the case where the display chassis 14 is opened, but the embodiment is not limited to this. The same control can be also performed on the case where the display chassis 14 is closed. That is to say, when the open angle $\theta$ becomes smaller than the threshold, the controller may depress the key depressing mechanism 70 at high speed when the opening/closing angular velocity $\omega$ is large and depress the mechanism at low speed when it is small.

Figure 9:
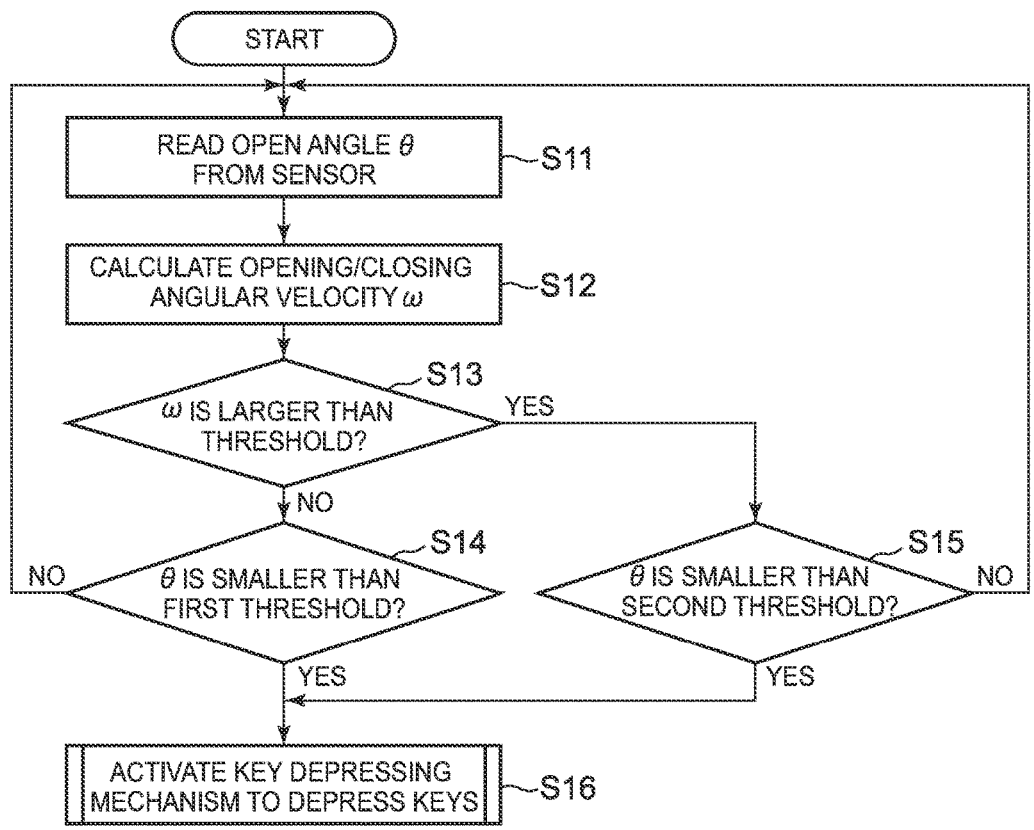
FIG. 9 is a flowchart illustrating a second control procedure of the key depressing mechanism.

Next, a control procedure illustrated in FIG. 9 will be explained. When closing the display chassis 14 from the state of the open angle $\theta=90$ degrees (see FIG. 2B) for example, the controller depresses the keys 21 raised up to the use position and retracts them to the depressed position. Steps S11 and S12 in FIG. 9 are the same processes as those of the above Steps S1 and S2.

In Step S13, the controller compares the opening/closing angular velocity $\omega$ with a threshold. The controller moves to Step S15 when being larger than the threshold (S13: Yes), and moves to Step S14 when being not more than the threshold (S13: No). In this case, because the opening/closing angular velocity $\omega$ is a closing-direction velocity of the display chassis 14, the threshold is a value defined in consideration of a polarity.

In Step S14, the controller compares the open angle $\theta$ with a comparatively small first threshold. The controller moves to Step S16 when being smaller than the first threshold (S14: Yes), and returns to Step S11 when being not less than the first threshold (S14: No).

On the other hand, in Step S15, the controller compares the open angle $\theta$ with a comparatively large second threshold. The controller moves to Step S16 when being smaller than the second threshold (S15: Yes), and returns to Step S11 when being not less than the second threshold (S15: No).

In Step S16, the controller activates the key depressing mechanism 70 to depress the keys 21. As a result, when the opening/closing angular velocity $\omega$ is fast, namely, larger than the threshold in Step S13, the controller starts to depress the keys 21 at the time at which the open angle $\theta$ becomes smaller than the second threshold (>the first threshold) and thus enables an operation with a margin. As a result, the rotation of the motor 100 and the speed reducer is reduced, and thus a sound can be reduced and a mechanical burden further becomes small. Moreover, When the opening/closing angular velocity $\omega$ is slow, namely not more than the threshold in Step S13, the depression of the keys 21 is postponed until the open angle $\theta$ becomes smaller than the first threshold (<the second threshold), and thus a time in which the keyboard 20 is valid is lengthened. In the control procedure illustrated in FIG. 9, the controller can constantly maintain the operating speed of the key depressing mechanism 70. In that case, the motor 100 and its driver circuit may be a constant-speed rotation type.

In the control procedure illustrated in FIG. 9, in Step S13, the opening/closing angular velocity ω is divided into two cases based on a threshold, but it may be divided into three or more cases or may be continuously changed. Moreover, the control procedure illustrated in FIG. 9 illustrates the case where the display chassis 14 is closed, but the same control can be also performed on the case where it is opened. That is to say, when the opening/closing angular velocity ω is small, the controller starts the operation of the key depressing mechanism 70 after the open angle θ becomes not less than the second threshold. When the opening/closing angular velocity ω is large, the controller starts the operation of the key depressing mechanism 70 at the time at which the open angle θ becomes not less than the first threshold.

Figure 10:
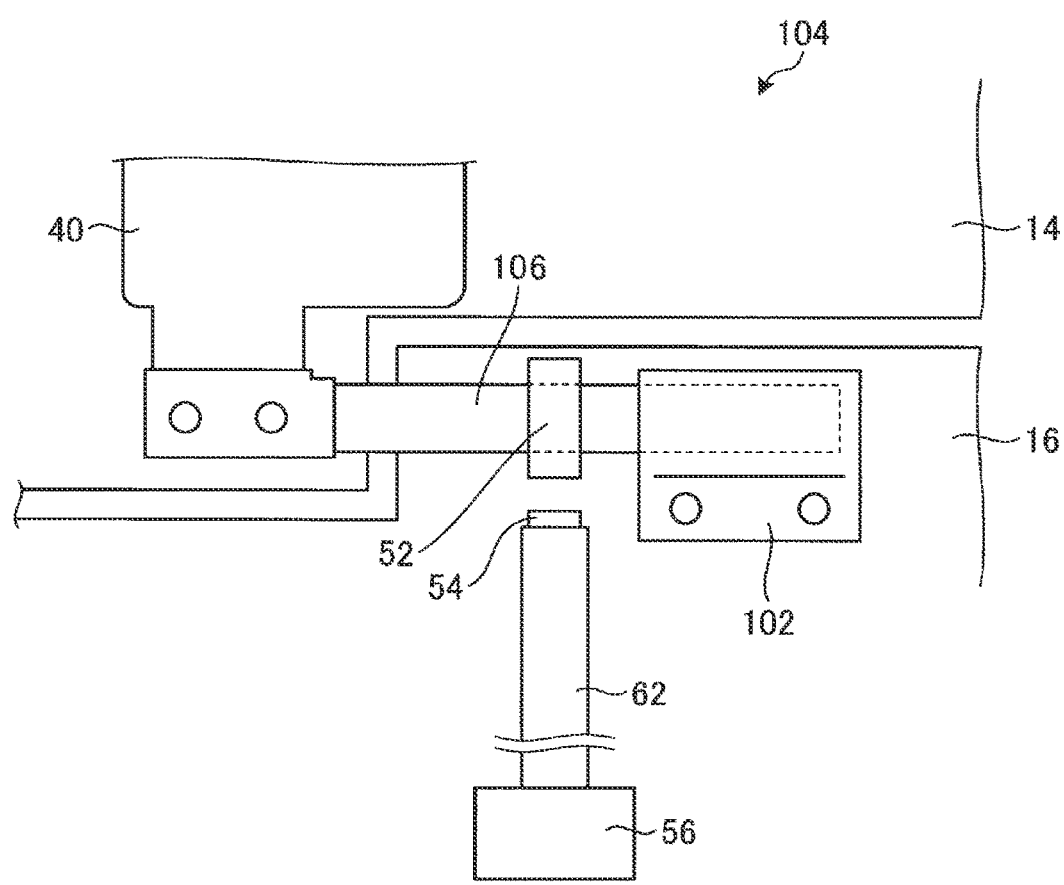
FIG. 10 is a schematic diagram of a hinge device according to an alternative example of the embodiment.

It has been explained that the hinge device 12R described above is a biaxial hinge device including the first chassis shaft 24 and the second chassis shaft 26, but the present embodiment is not limited to this. The present embodiment can be applied to a uniaxial hinge device 104 as illustrated in FIG. 10. In the hinge device 104, a rotating shaft 106 fixed to the display chassis 14 is supported by a bearing 102 inside the main-body chassis 16. The rotating shaft 106 rotates relative to the main-body chassis 16 with the opening and closing of the display chassis 14. Inside the main-body chassis 16, the magnet 52 is non-rotatably fixed to the rotating shaft 106. The structure and means that the sensor 54 measures the rotation of the magnet 52 and the controller 56 calculates the open angle θ and the opening/closing angular velocity ω are similar to the above case. In this case, the open angle of the rotating shaft 106 is equal to the open angle θ of the display chassis 14. According to such the hinge device 104, the open angle θ and the opening/closing angular velocity ω can be calculated while employing a simple structure.

For example, the uniaxial hinge device may have a configuration that the rotating shaft 106 is non-rotatably provided with respect to the main-body chassis 16 and the display chassis 14 is rotatably provided with respect to the rotating shaft 106. In this case, the rotating shaft 106 may be inserted into the cylindrical body 50 non-rotatably fixed to the display chassis 14, and the magnet 52 may be fixed to the cylindrical body 50.

The hinge device 12R can be preferably applied to, other than a laptop PC, an electronic apparatus such as a mobile phone, a smartphone, and an electronic notebook, in which the display chassis can be rotated relative to the main-body chassis.

The present invention is not limited to the embodiment as described above, and the embodiment can be freely changed without departing from the scope of the present invention.

The invention claimed is:

1. An electronic apparatus, comprising:
 a hinge device that enables rotary motion of first and second chassis, the hinge device having:
  a rotating shaft that rotates with the rotary motion;
  a magnet that is non-rotatably fixed to the rotating shaft;
  a sensor that detects a movement of the magnet associated with the rotary motion from a change of magnetism; and
  a controller that reads a signal from the sensor to calculate at least one of an open angle and an opening/closing angular velocity of the first and second chassis;
  a first chassis shaft that is non-rotatable with respect to the first chassis,
  wherein the rotating shaft includes a cylindrical body into which the first chassis shaft is rotatably inserted and rotates relative to the first chassis shaft with the rotary motion,
  wherein the cylindrical body includes a step for rotation stop that supports the magnet from an axial-direction lateral side.

2. The hinge device according to claim 1, wherein the sensor is fixed inside the first chassis.

3. The hinge device according to claim 1, wherein the magnet is inside the first chassis.

4. An electronic apparatus, comprising:
 a hinge device that enables rotary motion of first and second chassis, the hinge device having:
  a rotating shaft that rotates with the rotary motion;
  a magnet that is non-rotatably fixed to the rotating shaft;
  a sensor that detects a movement of the magnet associated with the rotary motion from a change of magnetism; and
  a controller that reads a signal from the sensor to calculate at least one of an open angle and an opening/closing angular velocity of the first and second chassis;
  a first chassis shaft that is non-rotatable with respect to the first chassis,
  wherein the rotating shaft includes a cylindrical body into which the first chassis shaft is rotatably inserted and rotates relative to the first chassis shaft with the rotary motion,
  a second chassis shaft that is non-rotatable with respect to the second chassis;
  a link that holds the first and second chassis shafts in parallel; and
  a synchronization part that synchronously rotates the first and second chassis shafts in directions opposite to each other.

5. The electronic apparatus according to claim 4, wherein: the first chassis or the second chassis comprises:
 a keyboard that includes a plurality of keys;
 a key depressing mechanism that depresses the keys; and
 a motor that drives the key depressing mechanism, and the controller further:
 drive the motor based on at least one of the open angle and the opening/closing angular velocity;
 compares the opening/closing angular velocity with a threshold;
 when the opening/closing angular velocity is not more than the threshold, the controller raises the key depressing mechanism to low speed;
 when the opening/closing angular velocity is larger than the threshold, the controller raises the key depressing mechanism to high speed.

6. The electronic apparatus according to claim 5, wherein the controller further:
 change a state of at least one of an input device and an output device based on the opening/closing angular velocity;
 compares the open angle with a threshold;
 compares the opening/closing angular velocity with another threshold;
 when the opening/closing angular velocity is not more than the another threshold, the controller raises the key depressing mechanism to low speed;

when the opening/closing angular velocity is larger than the another threshold, the controller raises the key depressing mechanism to high speed.

7. An electronic apparatus, comprising:
a hinge device that enables rotary motion of first and second chassis, the hinge device having:
  a rotating shaft that rotates with the rotary motion;
  a magnet that is non-rotatably fixed to the rotating shaft;
  a sensor that detects a movement of the magnet associated with the rotary motion from a change of magnetism; and
  a controller that:
    reads a signal from the sensor to calculate at least one of an open angle and an opening/closing angular velocity of the first and second chassis;
    changes a state of at least one of an input device and an output device based on the opening/closing angular velocity;
    divides the opening/closing angular velocity into at least a first case and a second case based on a threshold;
    in the first case, when the opening/closing angular velocity is greater than the threshold, starts the operation of the key depressing mechanism after the open angle is less than a second threshold;
    in the second case, when the opening/closing angular velocity is less than the threshold, starts the operation of the key depressing mechanism after the open angle is less than a first threshold.

* * * * *